United States Patent Office 3,496,138
Patented Feb. 17, 1970

3,496,138
ADDUCTS OF POLYGLYCOL DIAMINES AND CURABLE COMPOSITIONS COMPRISING POLYEPOXIDES AND SAID ADDUCTS
Ralph F. Sellers, Middlebush, and Charles F. Pitt, Basking Ridge, N.J., assignors to Union Carbide Corporation, a corporation of New York
No Drawing. Continuation of application Ser. No. 121,358, July 3, 1961. This application Aug. 1, 1966, Ser. No. 570,132
The portion of the term of the patent subsequent to Apr. 25, 1984, has been disclaimed
Int. Cl. C08g 30/14; C07c 93/04
U.S. Cl. 260—47                    13 Claims

ABSTRACT OF THE DISCLOSURE

This application relates to an adduct formed on reacting a diepoxide with a polyglycol diamine of the formula:

$$H_2N(CH_2)_3O(C_nH_{2n}O)_x(CH_2)_3NH_2$$

wherein $n$ has a value of 2 to 5 inclusive and $x$ has a value of 1 to 85 inclusive and to polyepoxide compositions containing this adduct which are characterized, on being cured to infusible products, by excellent physical properties.

---

This application is a continuation of application Ser. No. 121,358, filed July 3, 1961, now abandoned.

This invention relates to adducts of polyglycol diamines and to a process for the preparation thereof. More specifically, this invention relates to adducts of polyglycol diamines and to curable polyepoxide compositions containing these adducts.

Polyglycol diamines, as for example, di(3-aminopropyl) ether of diethylene glycol of the formula:

$$H_2N(CH_2)_3O(CH_2-CH_2-O)_2(CH_2-)_3NH_2$$

are particularly desirable for use as hardeners in polyepoxide compositions, as the resultant compositions, once cured, have excellent impact strength and excellent flexibility. It has been found, however, that such polyglycol diamines are hygroscopic and as a result polyepoxide compositions containing these polyglycol diamines, when applied as protective coatings onto wod, metal and other like surfaces and cured to infusible products, are hazy or cloudy in appearance. Consequently, polyepoxide compositions containing polyglycol diamines have little if any utility in applications wherein clear, aesthetically attractive, protective coatings are desired. Furthermore, polyepoxide compositions containing polyglycol diamines, of the type described, tend to foam during their curing cycle trapping within the compositions air and gases evolved from volatiles which may have been present therein. The presence of entrapped gases results in a cured product having undesirable pits and voids. Such cured products are characterized by structural weaknesses especially at the areas of the pits and voids. In addition, polyepoxide compositions into which have been incorporated polyglycol diamines, when applied as coatings on various surfaces, require relatively long periods of time in which to cure to infusible products whose sur faces are tack-free. For obvious reasons, in painting and spray coating applications, it is necessary that the coatings applied cure to an infusible, tack-free state in a relatively short period of time.

The present invention provides for polyglycol diamine adducts, which on being admixed with polyepoxides, provide polyepoxide compositions which on being cured, have excellent impact strength and excellent flexibility. In addition, polyepoxide compositions of this invention cure, in a relatively short period of time, to infusible, tack-free products which are "blush-free," i.e., are not hazy or cloudy in appearance, even in an atmosphere of high humidity, that is, in an atmosphere of 80 to 100 percent relative humidity. Also, polyepoxide compositions of this invention undergo no undesirable foaming during their curing cycle and as a result cure to infusible products, free of voids and pits, characterized by excellent surface characteristics.

The polyglycol diamine adducts of this invention comprise the reaction product of a polyglycol diamine of the formula:

Formula I $$H_2N(CH_2)_3O(C_nH_{2n}O)_x(CH_2)_3-NH_2$$

wherein: $n$ has a value of 2 to 5 inclusive, preferably 2 to 3 inclusive and $x$ has a value of 1 to 85 inclusive, preferably 2 to 50 inclusive; and a diepoxide, that is those compounds having 2 epoxy groups per molecule wherein the oxygen atom of the epoxy group is attached to vicinal carbon atoms with the resultant adduct having 6-amino-hydrogen atoms per molecule.

The polyglycol diamines which are reacted with the diepoxides to produce the adducts of this invention can be conveniently prepared by cyanoalkylating a glycol of the formula:

Formula II $$HO(C_nH_{2n}O)_xH$$

wherein $n$ and $x$ are as previously defined in Formula I, by reacting the glycol with at least 2 moles of acrylonitrile, per mole of glycol, at a temperature of from about 20° C. to about 60° C. in the presence of an alkali metal alkoxide, such as sodium methoxide, to form the corresponding cyanoalkylated compound. The cyanoalkylated compound is then hydrogenated at a temperature of from about 95° C. to about 100° C. in the presence of nickel, as a catalyst, and at pressures on the order of about 1500 p.s.i.g.

Suitable glycols coming within the purview of Formula II which can be cyanoalkylated with acrylonitrile include, among others, ethylene glycol, diethylene glycol, 1,2-propylene glycol, 1,3-propylene glycol, 1,4-butylene glycol, poly(ethylene glycol) having an average molecular weight of 3700, poly(propylene glycol) having an average molecular weight of 1600 and the like. Illustrative of specific glycol diamines are di-(3-aminopropyl)ether of ethylene glycol, di-(3-aminopropyl)ether of 1,2-propylene glycol, di-(3-aminopropyl)ether of diethylene glycol, di-(3-aminopropyl)ether of triethylene glycol, di-(3-aminopropyl)ether of dipropylene glycol, di-(3-aminopropyl)ether of poly (ethylene glycol), di-(3-aminopropyl)ether of poly-(propylene glycol) and the like.

The diepoxides which are reacted with the polyglycol diamines of Formula I to produce the adducts of this invention are, as stated, those compounds having 2 epoxy groups per molecule. These compounds, wherein the oxygen atom of the epoxy group is attached to vicinal carbon atoms, can be saturated or unsaturated, aliphatic, cycloaliphatic, or heterocyclic and can be substituted with substituents such as halogen atoms, alkyl groups, ether groups and the like.

Illustrative of suitable diepoxides are the diglycidyl ethers of such phenols as the mononuclear dihydric phenols, exemplary of which are resorcinol, catechol, hydroquinone and the like, the polynuclear dihydric phenols such as the bis-(p-hydroxyphenyl)alkanes among which can be noted bis-(p-hydroxyphenyl)-methanes, 1,1-bis-(p - hydroxyphenyl) - propane, 2,2 - bis - (p - hydroxyphenyl) - propane, 2,2 - bis - (p - hydroxyphenyl)-butane and the like, the dihydric phenols which have alkyl, aryl and/or halogen ring substituents. These latter compounds are exemplified by the methyl resorcinols, the tribromo resorcinols and the substituted bisphenols disclosed in Bender et al. U.S. Patent 2,506,486.

A preferred diglycidyl ether for purposes of this invention has the formula:

Formula III

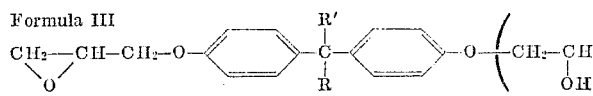

wherein $a$ has a value of 0 to 1 inclusive, R and R' are hydrogen or alkyl groups, preferably alkyl groups having 1 to 4 carbon atoms inclusive. R and R' can be the same or different. Exemplary of polyglycidyl ethers of bis-(p-hydroxyphenyl) - alkanes following within the scope of Formula III above are: diglycidyl ether of 2,2 - bis - (p-hydroxyphenyl) - propane, diglycidyl ether of bis-(p-hydroxyphenyl)-methane and other like compounds. Other suitable diglycidyl ethers of polyhydric phenols are enumerated in U.S. Patent 2,633,458 to E. C. Shokal.

Also suitable are the diglycidyl ethers of dihydric alcohols such as the reaction products of epichlorohydrin and aliphatic compounds containing 2 hydroxyl groups such as ethylene glycol, propane diols, butane diols and the like. Methods of preparing diglycidyl ethers of dihydric alcohols are described in U.S. Patent 2,898,349 to P. Zuppinger et al.

Other suitable diglycidyl compounds are the diglycidyl esters of dicarboxylic acids, such as the diglycidyl esters of adipic acid, phthalic acid, and the like. Diglycidyl esters of dicarboxylic acids are described in detail in U.S. Patent 2,870,170 to Payne et al. Also suitable are diglycidyl compounds produced by reacting epichlorohydrin with aromatic amines, such as aniline, 2,6-dimethylaniline, p-toluidine, m-chloraniline, p-aminodiphenyl, and the like. Specific compounds include, among others, N,N-diglycidylaniline and N,N-diglycidyl-2,6-dimethylaniline. Diglycidyl derivatives of aromatic amines and methods for their preparation are further described in U.S. Patent 2,951,822 to N. H. Reinking.

The so-called "peracetic acid epoxides" which are obtained by epoxidation across a double bond using peracetic acid, such as 1,2,5,6-diepoxydimethyl cyclooctane, 3,4 - epoxy - 6 - methylcyclohexylmethyl - 3,4 - epoxy-6-methylcyclohexane carboxylate, 2-ethyl-1,3-hexanediol bis-(3,4-epoxycyclohexane carboxylate), bis-(2,3 - epoxycyclopentenyl) ether, vinylcyclohexane dioxide, dicyclopendadiene dioxide, diethylene glycol bis-(3,4-epoxy-6-methylcyclohexane carboxylate), 3,4 - epoxycyclohexylmethyl 3,4 - epoxycyclohexanecarboxylate, 3,4 - epoxy-1-methylcyclohexylmethyl - 3,4 - epoxy - 1 - methylcyclohexanecarboxylate, 1,6 - hexanediol bis-(3,4 - epoxycyclohexanecarboxylate), bis-(3,4 - epoxycyclohexylmethyl) oxylate, 3,4 - epoxy - 6 - methylcyclohexylmethyl 9,10-epoxystearate, 1,2 - bis-(2,3 - epoxy - 2 - methyl propoxy) ethane, 4,5 - epoxypentyl - 4,5 - epoxy pentanoate, bis-(3,4 - epoxy - 6 - methylcyclohexylmethyl) sebacate, diglycidyl acetal, divinyl benzene dioxide, dipentene dioxide, 1,2,5,6-diepoxy cyclooctane, bis-(3,4-epoxy-6-methylcyclohexylmethyl) adipate, glycidyl 2,3 - epoxy cyclopentyl ether, 3,9 - bis-(1,2 - epoxy - 1 - methylethyl) spirobi(meta dioxane), bis-(3,4-epoxycyclohexyl)sulfone, glycidyl 2,3 - epoxybutyl ether, bis-(2,3 - epoxy - 2 - methylpropyl)ether, 1,1 - bis-(2,3 - epoxy - 2 - methyl propoxy) ethane, di(6-methyl - 3,4 - epoxycyclohexylmethyl) ether (6 - methyl 3,4 - epoxycyclohexylmethyl) (3,4 - epoxycyclohexylmethyl) ether, and other like diepoxides which are free of amino, amido, carboxyl and anhydride groups.

The reaction of a polyglycol diamine with a diepoxide to produce the polyglycol diamine adducts of this invention can be illustrated by the following equation:

$2H_2N-(CH_2)_3-O-(C_nH_{2n}O)_x(CH_2)_3-NH_2 +$

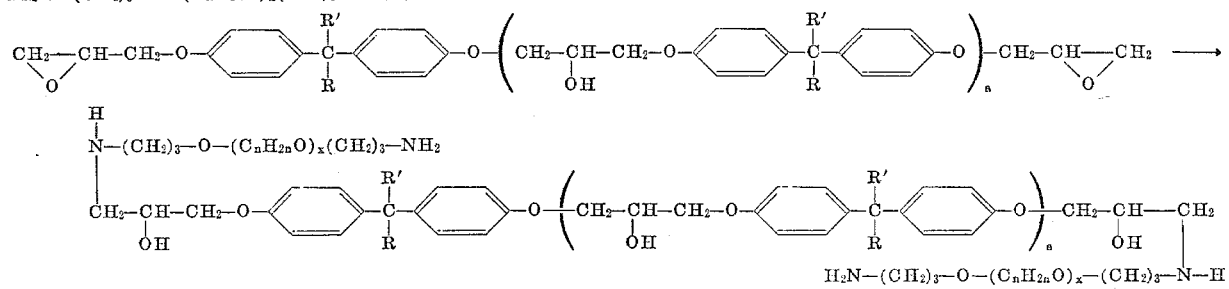

$H_2N-(CH_2)_3-O-(C_nH_{2n}O)_x-(CH_2)_3-N-H$ wherein: $n$, $x$, $a$, R and R' are as previously defined in Formulas I and III.

Various amounts of the polyglycol diamines and the diepoxides can be reacted to produce the corresponding adducts, generally at least about 2 moles of polyglycol diamine per mole of diepoxide. Using from about 3 to about 7 moles of the polyglycol diamine per mole of diepoxide is satisfactory. More than about 7 moles of the polyglycol diamine, per mole of the diepoxide, can be employed, if so desired, but this is economically undesirable as the yield of the adduct is not materially increased. It is preferred to use about 7 moles of polyglycol diamine per mole of diepoxide.

When two or more molecules of a polyglycol diamine are caused to react with one molecule of a diepoxide as described, the primary reaction is one wherein an adduct is formed which contains six amino-hydrogen atoms per molecule. It is to be understood, however, that other secondary reactions occur wherein other reaction products are formed containing a plurality of amino-hydrogen atoms more or less in number than six.

The temperature at which the reaction between the polyglycol diamines and the diepoxides is conducted can be varied over a wide range, from about 25° C. to a temperature of about 100° C. At temperatures lower than about 25° C. the reaction proceeds sluggishly. A temperature in the range of from about 25° C. to about 75° C. is most preferred.

The reaction between the polyglycol diamines and the diepoxides is conducted, generally, under atmospheric pressure, although if desired, the reaction can be conducted under subatmospheric or superatmospheric pressure.

The process of the present invention by which the polyglycol diamine adducts are produced is simply conducted by admixing a polyglycol diamine with a diepoxide at the desired temperature. In order to decrease the time of reaction, it is customary to pre-heat the polyglycol diamines and the diepoxides and to then admix the heated reactants. The exact temperature to which the reactants are heated will depend upon the specific reactants used. Completion of the reaction is reached when all epoxy groups of the diepoxides have reacted as determined by the method described in an article by Leon Schechter, John Wynstra and Raymond P. Kurkjy appearing on pages 94–97 of the January 1956 issue of Industrial and Engineering Chemistry.

The reaction product can be used directly as a hardener for polyepoxides provided that it contains at least about 35 percent by weight of the adduct or if desired, the reaction product can first be purified by distilling off the unreacted polyglycol diamine at the boiling temperature of the diamine.

If desired, the viscosity of the diepoxides can be adjusted to the desired consistency, facilitating admixing of the diepoxides with the polyglycol diamines by the use of reactive diluents, that is diluents containing a single epoxy group, i.e.,

Among such suitable reactive diluents are butyl glycidyl ether, allyl glycidyl ether, phenyl glycidyl ether and the like. When used, reactive diluents are employed in amounts of from about 10 percent by weight to about 15 percent by weight based on the weight of the diepoxide.

As previously stated the polyglycol diamine adducts are particularly desirable for use as hardeners for polyepoxides. Illustrative of suitable polyepoxides are those having an epoxy equivalency of greater than 1, that is, those compounds having an average of more than 1 epoxy group, i.e.,

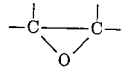

per molecule. These compounds, wherein the oxygen of the epoxy group is attached to vicinal carbon atoms, can be saturated or unsaturated, aliphatic, cycloaliphatic, or heterocyclic, and can be substituted with substituents such as halogen atoms, alkyl groups, ether groups, and the like.

In further explanation of the term "epoxy equivalency" as used in this specification, it refers to the average number of epoxy groups contained in the average polyepoxide molecule. This value is obtained by dividing the molecular weight of the polyepoxide by its calculated epoxide equivalent weight. The epoxide equivalent weight is determined by heating a one gram sample of the polyepoxide with an excess of pyridinium chloride which is dissolved in pyridine. The excess pyridinium chloride is then back-titrated with 0.1 N sodium hydroxide to an end point using phenolphthalein as the indicator. The epoxide equivalent weight is calculated by considering that one HCl molecule is equivalent to one epoxide group. If the polyepoxide is a single compound and all of its epoxy groups are intact, the epoxy equivalency values will be integers of whole numbers, such as 2, 3, 4 and the like. In those instances wherein the polyepoxide is a mixture of polyepoxides or contains some monomeric monoepoxides or where the polyepoxide has some of its epoxy groups hydrated or otherwise reacted, the epoxy equivalency values may contain fractions, such as 1.2, 1.5, 2.8, and the like.

Exemplary of polyepoxides having an epoxy equivalency of greater than one which can be cured to infusible products by means of the polyglycol diamine adducts of this invention, in addition to the diepoxides previously described in this specification are the following: the polyglycidyl ethers of polyhydric phenols exemplified by the polyphenylols such as the novolak condensation products of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,885,385 to A. G. Farnham; the polyglycidyl ethers of polyhydric alcohols such as the reaction products of epichlorohydrin and polyhydric alcohols, for example glycerine, hexane triols and the like; the polyglycidyl compounds of amino phenols such as p-aminophenol, 5-amino-1-naphthol, 4-aminoresorcinol, 2-methyl-4-aminophenol, 2-chloro-4-aminophenol, and the like. Specific compounds include, among others, N,N,N',N'-tetraglycidyl-4,4'diaminodiphenylmethane, the triglycidyl derivative of p-aminophenol wherein the amino hydrogen and OH hydrogen atoms are replaced by glycidyl groups. Polyglycidyl derivatives of amino phenols and methods for their preparation are further described in U.S. Patent No. 2,951,825 to Norman H. Reinking et al.

It is to be understood that all patents and literature references referred to in this specification are incorporated herein by reference.

Amounts of polyglycol diamine adducts used are sufficient to cure the polyepoxides to infusible products. Generally these amounts range from about 75 percent of stoichiometric to about 25 percent in excess of stoichiometric and usually from about 90 percent of stoichiometric to about 10 percent in excess of stoichiometric. Optimum properties in cured polyepoxide compositions are usually achieved using a stoichiometric amount of the polyglycol diamine adduct. For purposes of stoichiometric calculations, one epoxy group:

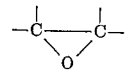

is deemed to react with one amino-hydrogen atom.

In those instances wherein the unreacted polyglycol diamine is not removed from the adduct, stoichiometric calculations are based on the total number of amino-hydrogens including those of the unreacted polyglycol diamine. In such instances, amounts generally used to harden polyepoxides range from about 75 percent of stoichiometric to about 25 percent in excess of stoichiometric as described in the preceding paragraph.

The curing reaction involving the polyglycol diamine adducts and the polyepoxides occurs when the desired diamine and polyepoxide are simply admixed together. The curing reaction occurs slowly at temperatures on the order of about 10° C. Below about 20° C., the curing reaction takes about 2 days. Generally, the mixture is heated to temperatures in the range of about 30° C. to about 200° C. Temperatures which are particularly preferred are in the range of about 20° C. to about 150° C.

In those instances wherein the polyepoxide is a relatively low viscosity liquid, it is admixed directly with the adduct. Polyepoxides which are too viscous for ready mixing with the adducts can be heated to reduce their viscosity or liquid solvents can be added thereto in order to provide the desired fluidity. Normally solid polyepoxides are either melted or mixed with liquid solvents.

Suitable solvents for imparting the desired fluidity to highly viscous or normally solid polyepoxides are ketones, such as acetone, methyl isobutyl ketone, isophorone, and the like; esters, such as ethyl acetate, butyl acetate, ethylene glycol monoacetate, acetate of ethylene glycol monomethyl ether, and the like; ether alcohols, such as the methyl, ethyl, and butyl ether of ethylene glycol or of diethylene glycol; chlorinated hydrocarbons, such as trichloropropane, trichloromethane, and the like. Also suitable in admixture with the solvents noted are the aromatic hydrocarbons, such as benzene, toluene, xylene, and the like; alcohols, such as ethyl alcohol, isopropyl alcohol, n-butyl alcohol, and the like. The actual amount of solvent used will depend upon the polyepoxide being employed. If desired, rather than using solvents of the type described, or in addition thereto, reactive liquid diluents containing a single epoxy group:

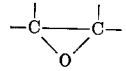

can be used in order to achieve the desired fluidity in the polyepoxides. Suitable reactive liquid diluents have been previously enumerated. In determining stoichiometric amounts with respect to the polyglycol diamine adducts the presence of "reactive" diluents is taken into account with one epoxy group deemed to react with one amino-hydrogen atom.

Additional materials, such as fillers, pigments, fibers, dyes, plasticizers, flame retardants and the like can be added either to the polyepoxides or to the adducts, if desired.

The following examples further illustrate the present invention and are not intended to limit the scope thereof in any manner.

EXAMPLE 1

Six hundred grams (1.56 moles) of diglycidyl ether of 2,2-bis-(p-hydroxphenyl)-propane having an epoxide equivalent weight of 192 and an epoxy equivalency of 2 were heated to 70° C. and added with stirring to 2400 grams (10.9 moles) of di-(3-aminopropyl) ether of diethylene glycol, preheated to 40° C., over a period of 45 minutes. During this 45-minute period, a mild exothermic reaction raised the temperature of the mixture to a maximum of 75° C. The product so formed was then allowed to stand at room temperature, about 23° C., until it cooled to room temperature.

The liquid product had a viscosity at 25° C. of 193 centistokes, a calculated equivalent weight of 74.1 grams per gram equivalent of amino-hydrogen and contained a calculated 42.8 percent by weight of the polyglycol diamine adduct.

The calculated equivalent weight of the polyglycol diamine adduct was 137.3 grams per gram equivalent of amino-hydrogen.

Di-(3-aminopropyl) ether of diethylene glycol noted in this and in subsequent examples has the formula:

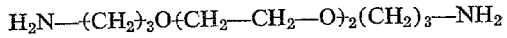

Viscosity measurements noted in this and in subsequent examples was determined using a Gardner bubble viscosimeter.

EXAMPLE 2

This example was conducted in a manner identical to that described in Example 1 with the exception that a mixture of 72 grams butyl glycidyl ether and 528 grams (1.38 moles) of the diglycidyl ether described in Example 1 was used in lieu of the 600 grams of the diglycidyl ether of Example 1.

The liquid product had a viscosity at 25° C. of 156 centistokes, a calculated equivalent weight of 74.4 grams per gram equivalent of amino-hydrogen and contained a calculated 44.2 percent by weight of the polyglycol diamine adduct.

The calculated equivalent weight of the polyglycol diamine adduct was 134.0 grams per gram equivalent of amino-hydrogen.

EXAMPLE 3

This example was conducted in a manner identical to that described in Example 2 with the exception that a mixture of 96 grams of butyl glycidyl ether and 704 grams (1.83 moles) of the diglycidyl ether was used.

The liquid product had a viscosity at 25° C. of 312 centistokes, a calculated equivalent weight of 81.6 grams per gram equivalent of amino-hydrogen and contained a calculated 55.3 percent by weight of the polyglycol diamine adduct.

The calculated equivalent weight of the polyglycol diamine adduct was 134.0 grams per gram equivalent of amino-hydrogen.

EXAMPLE 4

This example was conducted in a manner identical to that described in Example 1 with the exception that 1,000 grams (2.6 moles) of the diglycidyl ether and 2,000 grams (9.1 moles) of di-(3-amino-propyl)ether of diethylene glycol were used.

The liquid product had a viscosity at 25° C. of 3,000 centistokes, a calculated equivalent weight of 96.3 grams per gram equivalent of amino-hydrogen and contained a calculated 71.5 percent by weight of the polyglycol diamine adduct.

The calculated equivalent weight of the polyglycol diamine adduct was 137.3 grams per gram equivalent of amino-hydrogen.

EXAMPLE 5

One hundred grams of diglycidyl ether of 2,2-bis-(p-hydroxyphenyl)-propane having an epoxide equivalent weight of 192 and an epoxy equivalency of 2 were admixed at room temperature, about 23° C. with 39 grams (a stoichiometric amount) of the liquid product described in Example 1. A 30-gram sample of the composition was placed in an oven, which was at a temperature of 175° C., and cured to an infusible product by being maintained therein for 5 minutes.

No foaming of the composition occurred during the curing cycle.

The cured product so produced was free of all undersirable pits and voids.

Example 5 was repeated using in place of the product described in Example 1, 29 grams (a stoichiometric amount) of di-(3-aminopropyl ether) of diethylene glycol. This composition foamed considerably during the curing cycle and the cured product obtained was characterized by undesirable pits and voids.

EXAMPLE 6

One hundred grams of the diglycidyl ether described in Example 5 were admixed at room temperature, about 23° C., with 39 grams (a stoichiometric amount) of the liquid product described in Example 2. A 30-gram sample of this composition was placed in an oven, which was at a temperature of 175° C., and cured to an infusible product by being maintained therein for 5 minutes.

No foaming of this composition occurred during the curing cycle.

The cured product so produced was free of all undesirable pits and voids.

EXAMPLE 7

One hundred grams of the diglycidyl ether described in Example 5 were admixed at room temperature, about 23° C., with 43 grams (a stoichiometric amount) of the liquid product described in Example 3. A 30-gram sample of this composition was placed in an oven, which was at a temperature of 175° C., and cured to an infusible product by being maintained therein for 5 minutes.

No foaming of the composition occurred during the curing cycle.

The cured product so produced was free of all undesirable pits and voids.

EXAMPLE 8

Composition, whose formulation is noted below, was were admixed at room temperature, about 23° C., to a homogeneous blend.

| | Weight in Grams | |
|---|---|---|
| | Control 1 | Composition A |
| Diglycidyl ether described in Example 5 | 100 | 100 |
| Di-(3-aminopropyl)ether of diethylene glycol | 29 | |
| Liquid product described in Example 1 | | 39 |

Each composition was then coated onto identical steel panels, using a paint brush, and the coated panels placed in a room in which the temperature was at about 80° C. and the relative humidity was about 80 percent, for 8 hours.

Coating from Control 1 was tacky and had a surface haze.

Coating from Composition A was tack-free and had excellent surface gloss.

EXAMPLE 9

Compositions whose formulations are noted below, were

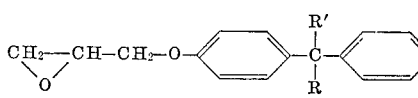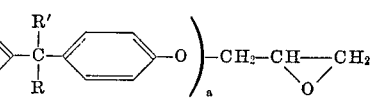

admixed at room temperature, about 23° C., to a homogeneous blend.

|  | Weight in Grams | |
|---|---|---|
|  | Control 2 | Composition B |
| Diglycidyl ether described in Example 5 | 90 | 90 |
| Triphenyl phosphite (flame retardant) | 10 | 10 |
| Methyl ethyl ketone | 20 | 20 |
| Xylene | 10 | 10 |
| Butanol | 10 | 10 |
| Di-(3-aminopropyl)ether of diethylene glycol | 29 | |
| Liquid product described in Example 1 |  | 36 |

Each composition was coated onto identical linoleum tile, by means of a paint brush, and the coated linoleum allowed to stand in a basement in which the temperature was 25° C. and the relative humidity about 80%.

Coating from Control 2 was tacky after 12 hours and did not lose its tackiness until allowed to stand in the basement described an additional 12 hours.

Coating from Composition B was tack-free and glossy after 12 hours.

Di-(3-aminopropyl)ether of diethylene glycol was present in Control 2 in an amount of 100 percent of stoichiometric.

The liquid product was present in Composition B in an amount of 93 percent of stoichiometric.

EXAMPLE 10

Composition, whose formulation is noted below, was admixed at room temperature, about 23° C., to a homogeneous blend.

Weight in grams
Diglycidyl ether described in Example 5 _____ 100
Titanium dioxide _____ 50
Liquid product described in Example 1 _____ 39

This composition was painted onto a window sill of cracked eroded wood.

The coating dried tack-free with high gloss in 5 hours.

We claim:

1. An adduct of a polyglycol diamine which is the reaction product of a diepoxide having 2 oxirane epoxy groups per molecule with at least about 2 moles per mole of said diepoxide, of a polyglycol diamine of the formula:

$$H_2N(CH_2)_3O(C_nH_{2n}O)_x(CH_2)_3—NH_2$$

wherein $n$ has a value of 2 to 5 inclusive and $x$ has a value of 1 to 85 inclusive, said adduct having 6 amino-hydrogen atoms per molecule.

2. An adduct as defined in claim 1 wherein $n$ has a value of 2 to 3 inclusive and $x$ has a value of 2 to 50 inclusive.

3. An adduct as defined in claim 1 wherein the diepoxide is a diglycidyl ether of a dihydric phenol.

4. An adduct as defined in claim 1 wherein the diepoxide has the formula:

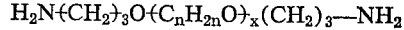

wherein $a$ has a value of 0 to 1 inclusive, and R and R' are members selected from the group consisting of hydrogen and alkyl groups.

5. An adduct as defined in claim 4 wherein the polyglycol diamine is di-(3-aminopropyl)ether of diethylene glycol.

6. An adduct as defined in claim 4 wherein the diepoxide is diglycidyl ether of 2,2-bis(p-hydroxyphenyl) propane.

7. Process for the preparation of an adduct of a polyglycol diamine which comprises reacting a diepoxide having 2 oxirane epoxy groups per molecule with at least about 2 moles, per mole of said diepoxide, of a polyglycol diamine of the formula:

$$H_2N(CH_2)_3O(C_nH_{2n}O)_x(CH_2)_3—NH_2$$

wherein $n$ has a value of 2 to 5 inclusive and $x$ has a value of 1 to 85 inclusive.

8. Process as defined in claim 7 wherein the said polyglycol diamine is used in amounts of from about 2 moles to about 10 moles per mole of said diepoxide.

9. Process as defined in claim 7 wherein the said polyglycol diamine is used in amounts of from about 3 moles to about 7 moles per mole of said diepoxide.

10. Process as defined in claim 7 wherein the reaction is conducted at a temperature of from about 25° C. to about 100° C.

11. A curable composition comprising a polyepoxide having an oxirane epoxy equivalency of greater than one and an adduct of a polyglycol diamine which is the reaction product of a diepoxide having 2 oxirane epoxy groups per molecule with at least about 2 moles per mole of said diepoxide, of a polyglycol diamine of the formula $$H_2N(CH_2)_3(C_nH_{2n}O)_x(CH_2)_3—NH_2$$

wherein $n$ has a value of 2 to 5 inclusive and $x$ has a value of 1 to 85 inclusive, said adduct having six amino-hydrogen atoms per molecule and being present in said composition in an amount sufficient to cure said composition to an infusible product.

12. A curable composition as defined in claim 11 wherein the said polyepoxide is diglycidyl ether of 2,2-bis(p-hydroxyphenyl)propane.

13. A curable composition as defined in claim 11 wherein the said adduct is the reaction product of diglycidyl ether of 2,2-bis(p-hydroxyphenyl)propane and di-(3-aminopropyl)ether of diethylene glycol.

References Cited

UNITED STATES PATENTS 3,316,185   4/1967   Reinking _____ 260—47

FOREIGN PATENTS 691,543   5/1953   Great Britain.

OTHER REFERENCES

Lee et al., "Epoxy Resins," p. 70 relied on, McGraw-Hill Book Co. Inc., New York, 1957.

WILLIAM H. SHORT, Primary Examiner

T. PERTILLA, Assistant Examiner

U.S. Cl. X.R.

117—127, 148, 161; 260—2, 51, 584, 830